United States Patent
Rich et al.

(10) Patent No.: US 9,553,720 B2
(45) Date of Patent: Jan. 24, 2017

(54) USING KEY MATERIAL PROTOCOL SERVICES TRANSPARENTLY

(71) Applicant: International Business Machines Corporation, Armonk, NY (US)

(72) Inventors: Bruce Arland Rich, Cary, NC (US); Gordon Kent Arnold, Cary, NC (US); Thomas Harry Benjamin, Cedar Park, TX (US); John Thomas Peck, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 14/138,461

(22) Filed: Dec. 23, 2013

(65) Prior Publication Data

US 2015/0180656 A1    Jun. 25, 2015

(51) Int. Cl.
*H04L 29/06* (2006.01)
*H04L 9/08* (2006.01)
*G06F 21/60* (2013.01)

(52) U.S. Cl.
CPC .............. *H04L 9/083* (2013.01); *G06F 21/602* (2013.01); *H04L 9/0891* (2013.01); *H04L 9/0894* (2013.01)

(58) Field of Classification Search
CPC ..................... H04L 9/0819; H04L 2209/24
See application file for complete search history.

(56) References Cited

U.S. PATENT DOCUMENTS

| | | | |
|---|---|---|---|
| 7,360,691 B2 | 4/2008 | Takayama | |
| 7,823,190 B1 * | 10/2010 | Kacarov et al. | 726/6 |
| 8,230,214 B2 | 7/2012 | Kanekar et al. | |
| 8,245,285 B1 | 8/2012 | Ravishankar et al. | |
| 8,831,992 B2 * | 9/2014 | Price et al. | 705/50 |
| 2006/0236096 A1 * | 10/2006 | Pelton et al. | 713/155 |
| 2006/0274899 A1 | 12/2006 | Zhu et al. | |
| 2008/0123855 A1 * | 5/2008 | Thomas | H04L 9/0894 380/277 |
| 2011/0038482 A1 * | 2/2011 | Singh et al. | 380/279 |
| 2012/0150897 A1 * | 6/2012 | Braksator et al. | 707/769 |
| 2013/0013931 A1 | 1/2013 | O'Hare et al. | |
| 2013/0055287 A1 * | 2/2013 | Pope | G06F 9/546 719/314 |
| 2014/0112477 A1 * | 4/2014 | Agarwal et al. | 380/277 |

* cited by examiner

*Primary Examiner* — Anthony Brown
*Assistant Examiner* — William Corum, Jr.
(74) *Attorney, Agent, or Firm* — Gail H. Zarick; David H. Judson

(57) ABSTRACT

An application that consumes key management information (e.g., keys and certificates) through a conventional keystore API is configured to recognize a new keystore type. In addition, the services of that API are pointed to a management server component associated with a key management protocol (e.g., KMIP), and a client component of the key management protocol is instantiated as a "semi-remote" keystore in association with the application. Once configured to use the new keystore type, the consuming application uses the keystore API in a conventional manner, but calls to the new keystore type are directed to the KMIP client. The client intercepts these calls and then interacts with the KMIP server on behalf of the consuming application, and without the application being aware of the interaction over the KMIP client-server API. This approach enables the consuming application to take advantage of the full benefits provided by the key management protocol transparently.

24 Claims, 3 Drawing Sheets

USING KEY MATERIAL PROTOCOL SERVICES TRANSPARENTLY

BACKGROUND OF THE INVENTION

Technical Field

This disclosure relates generally to cryptographic key lifecycle management.

Background of the Related Art

Business data is growing at exponential rates, and along with that growth is a demand for securing that data. Enterprises have responded by implementing encryption at various layers, such as in hardware, on the network, and in various applications. This response has resulted in a series of encryption silos, some of which hold confidential customer data, with fragmented approaches to security, keys and coverage. Further, different applications across the enterprise often employ different encryption methods. Thus, for example, some departments in the organization may use public-key cryptography while others use secret-key or hashes. Still others do not encrypt data while it is at rest (such as when it is stored on a device or in a database) but only when the data is in motion, using virtual private networks (VPNs) to secure the data pipeline. Key management for these encryption approaches is often similarly fragmented. Sometimes key management is carried out by department teams using manual processes or embedded encryption tools. Other times, the key management function is centrally managed and executed. In some cases, no formal key management process is in place. This fragmented approach to key management can leave the door open for loss or breach of sensitive data.

Key Management Interoperability Protocol (KMIP) is a relatively new standard for key management sponsored by the Organization for the Advancement of Structured Information Standards (OASIS). It is designed as a comprehensive protocol for communication between enterprise key management servers and cryptographic clients (e.g., from a simple automated device to a sophisticated data storage system). By consolidating key management in a single key management system that is KMIP-compliant, an enterprise can reduce its operational and infrastructure costs while ensuring appropriate operational controls and governance of security policy.

While KMIP provides significant advantages, the approach (and other cryptographic key management services like it) requires users to adapt to a remote protocol for accessing the materials retained therein. This requirement often dictates that code changes be implemented on the part of the using (consuming) applications.

To enable broader use of KMIP services, it would be desirable to enable users and applications to access these (and similar types of key management) services without forcing code changes by the consuming applications.

The subject matter of this disclosure addresses this need.

BRIEF SUMMARY

According to this disclosure, an application that consumes key management information (e.g., keys and certificates) through a conventional keystore API (e.g., the Java Security KeyStore API) is configured to recognize a new keystore type. In addition, the services of that conventional keystore API are pointed to a management server component associated with a key management protocol (e.g., KMIP), and a client component of the key management protocol (e.g., a KMIP client) is instantiated as a "semi-remote" keystore in association with the consuming application. Once configured to use the new keystore type, the consuming application uses the keystore API in a conventional manner, but calls to the new keystore type are directed to the KMIP client. The KMIP client intercepts these calls and then interacts with the KMIP management server transparently to the consuming application, i.e., without the consuming application being aware of the interaction over the KMIP client-server API. This approach enables the consuming application to take advantage of the full benefits provided by the key management protocol but without knowledge of the underlying management mechanism and while using (what appears to the consuming application as) just the conventional keystore API. In effect, the keystore API is extended to use the KMIP API transparently to facilitate various key management operations including, without limitation, interchange of keys between encryption applications, update of key and certificate materials, certification replacements, key modifications, and many others.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
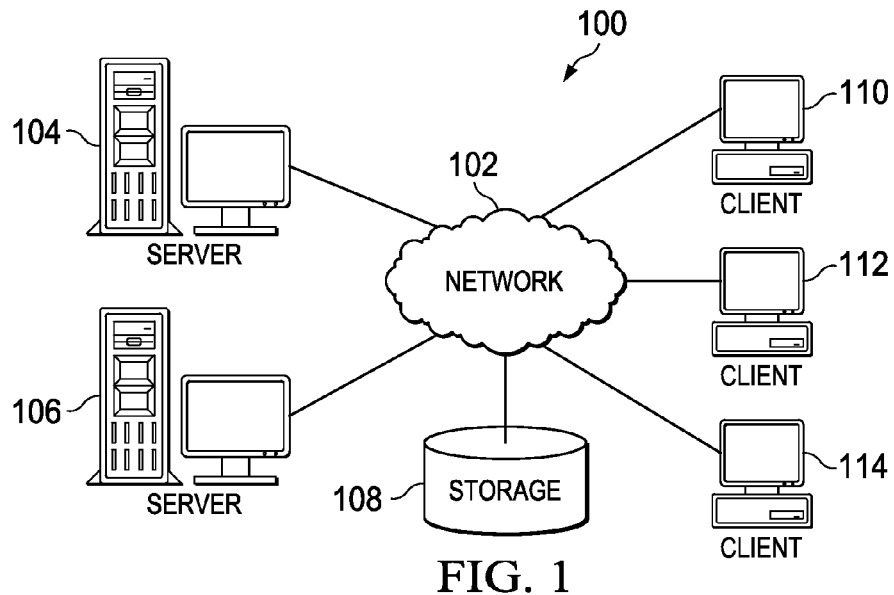
FIG. 1 depicts an exemplary block diagram of a distributed data processing environment in which exemplary aspects of the illustrative embodiments may be implemented.
Figure 2:
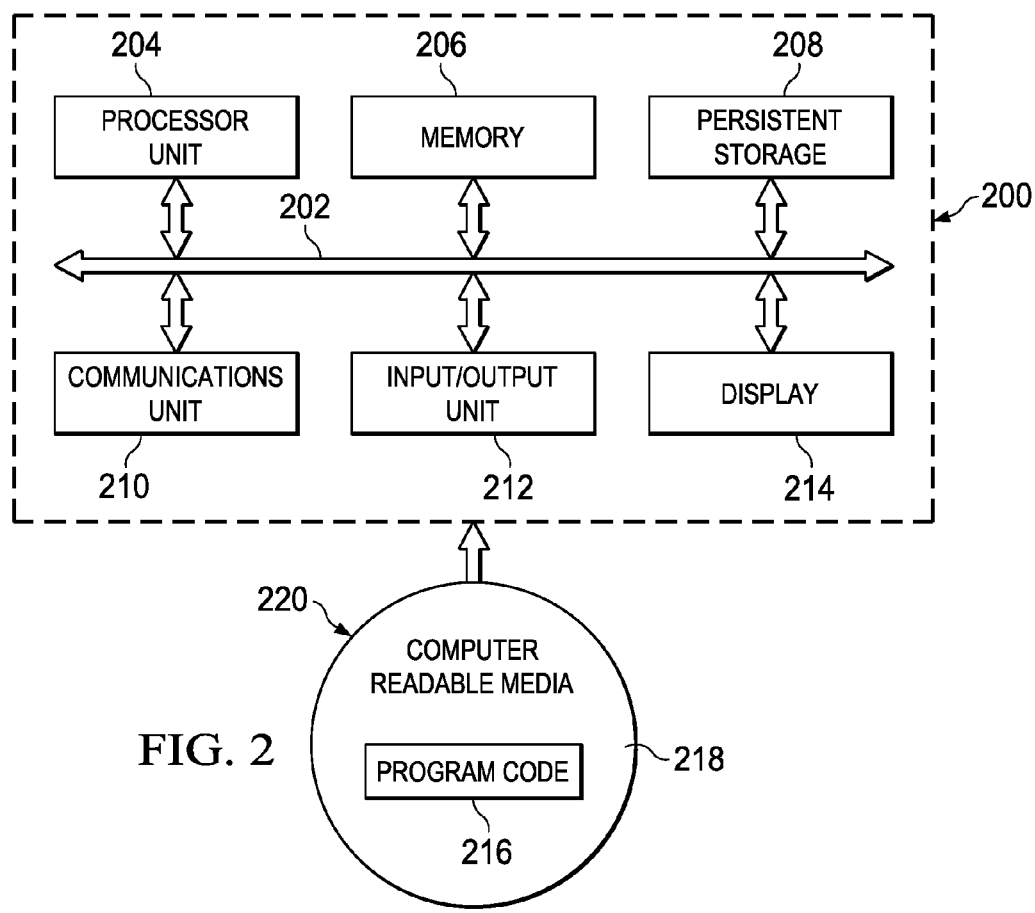
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides to the clients data, such as boot files, operating system images, and applications. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Key Management Interoperability Protocol (KMIP)

Figure 3:
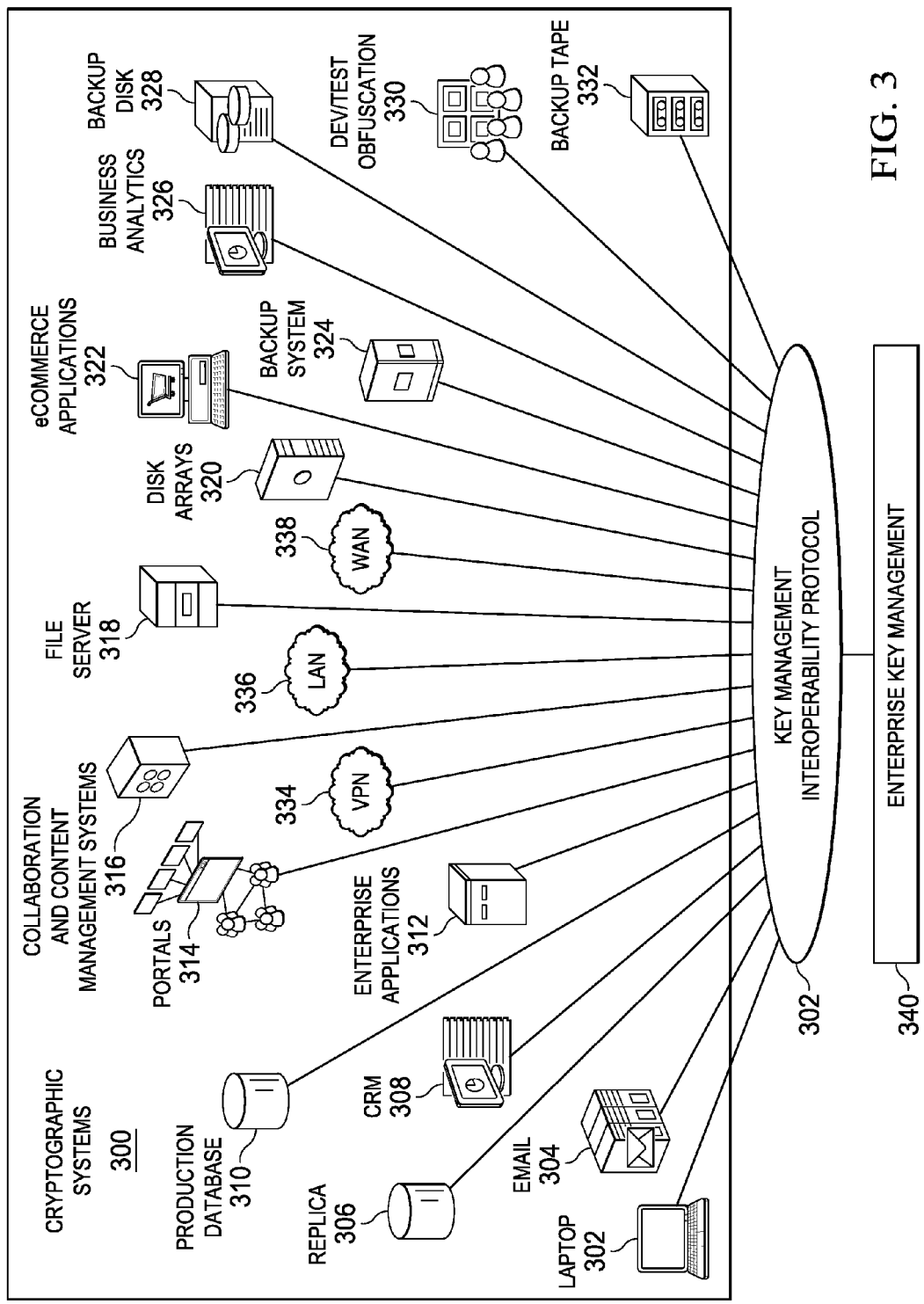
FIG. 3 is a representative enterprise environment in which the Key Management Interoperability Protocol (KMIP) is implemented.

As described above, the Key Management Interoperability Protocol (KMIP) enables key lifecycle management by defining a protocol for encryption client and key management server communication. Key lifecycle operations supported by the protocol include generation, submission, retrieval and deletion of cryptographic keys. Generally, KMIP enables cryptographic clients to communicate via a single protocol to all enterprise key management servers supporting that protocol. FIG. 3 illustrates an operating environment 300 in which the Key Management Interoperability Protocol 302 is implemented to facilitate key lifecycle management in this manner. As seen in FIG. 3, the environment may be quite varied and typically includes various systems, networks, devices, applications and other resources, each of which may rely in some manner upon encryption keys. Representative enterprise elements include, without limitation, staging systems 302, email systems 304, replica storage 306, customer relationship management (CRM) systems 308, production databases 310, enterprise applications 312, portals 314, collaboration and content management systems 316, file servers 318, disk arrays 320, electronic commerce applications 322, backup systems 324, business analytics systems 326, backup disks 328, development/test systems 330, and backup tape systems 332. Data is communicated among the systems and devices over VPN 334, LAN 336, WAN 338, and other networks (not shown).

To facilitate key management, an illustrative, but non-limiting enterprise embodiment implements a key management solution 340, such as IBM® Tivoli® Key Lifecycle Manager, which in a known commercial product that executes in an application server/database server operating environment, such as on IBM WebSphere® Application Server, and DB2®. The application server typically runs a Java virtual machine, providing a runtime environment for application code. The application server may also provide other services, such as communication security, logging, and Web services. The database server provides a relational database.

The key management solution 340 may be implemented within the network shown in FIG. 1 using one or more machines configured as shown in FIG. 2. An enterprise key management solution of this type enables KMIP communication with clients (such as one or more the systems illustrated) for key management operations on cryptographic material. The material includes, without limitation, symmetric and asymmetric keys, certificates, and templates used to create and control their use. The key management server 340 listens for connection requests from KMIP clients that send requests to locate, store, and manage cryptographic material on the server. Using the server 340, the enterprise manages the lifecycle of the keys and certificates. Thus, for example, among other functions, the server enables basic key serving, such as definition and serving of keys, definition of keys or groups of keys that can be associated with a device, and the like, as well as auditing functions. In a typical scenario, the server supports KMIP secret data and symmetric key interoperability profiles for KMIP server and client interactions. The server provides KMIP information, such as whether KMIP ports and timeout settings are configured, current KMIP certificate (indicating which certificate is in use for secure server or server/client communication), whether SSL/KMIP or SSL is specified for secure communication, and so forth. The server may also provide updating KMIP attributes for keys and certificates. The server 340 serves keys at the time of use to allow for centralized storage of key material in a secure location. It also includes a graphical user interface (or, in the alternative, a command line or other programmatic interface) by which administrators (or other permitted entities) centrally create, import, distribute, back up, archive and manage the lifecycle of keys and certificates. Using the interface, administrators can group devices into separate domains, defines roles and permissions, and the like. By default, typically, groups of devices only have access to encryption keys defined within their group. These role-based access control features enable separation of duties, mapping of permissions for what actions against which objects, and enforcement of data isolation and security in a multi-tenancy environment. This also enhances security of sensitive key management operations.

In operation, the management server assists encryption-enabled devices in generating, protecting, storing, and maintaining encryption keys that are used to encrypt and decrypt information that is written to and read from devices. The key management server acts as a background process waiting for key generation or key retrieval requests sent to it through a TCP/IP communication path between itself and various devices, such as a tape library, a tape controller, a tape subsystem, a device driver, a tape drive, a disk controller, a network switch, a smart meter, and others. These are merely representative cryptographic client devices. When a client writes encrypted data, it first requests an encryption key from the key management server.

KMIP standardizes communication between cryptographic clients that need to consume keys and the key management systems that create and manage those keys. It is a low-level protocol that is used to request and deliver keys between any key manager and any cryptographic client. KMIP uses the key lifecycle specified in NIST SP800-57 to define attributes related to key states. Network security mechanisms, such as SSL/TLS and HTTPS, are used to establish authenticated communication between the key management system and the cryptographic client.

Figure 4:
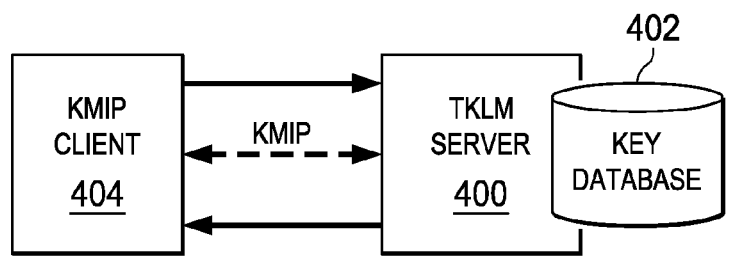
FIG. 4 illustrates a representative KMIP client-server implementation.

FIG. 4 illustrates a representative key management subsystem in a particular implementation. The sub-system comprises a cooperating set of components, namely, a Tivoli Key Lifecycle Manager (TKLM) server 400, a key store 402 having a database of keys, and a "KMIP" client 404. The identification of this particular commercial product is not intended to limit this disclosure. As described generally with respect to FIG. 3, the TKLM server 400 and associated key store 402 provide an enterprise key management solution enables KMIP communication with consuming applications, namely, the KMIP clients (such as client 404), for key management operations on cryptographic material. The material includes, without limitation, symmetric and asymmetric keys, certificates, and templates used to create and control their use. In operation, the key management server 400 listens for connection requests from KMIP clients that send requests to locate, store, and manage cryptographic material on the server. Using the server 400, the enterprise manages the lifecycle of the keys and certificates. Thus, for example, among other functions, the server enables basic key serving, such as definition and serving of keys, definition of keys or groups of keys that can be associated with a device (e.g., disk systems, drives, mobile devices, etc.), and the like, as well as auditing functions. In a typical scenario, the server supports KMIP secret data and symmetric key interoperability profiles for KMIP server and client interactions. The server provides KMIP information, such as whether KMIP ports and timeout settings are configured, current KMIP certificate (indicating which certificate is in use for secure server or server/client communication), whether SSL/KMIP or SSL is specified for secure communication, and so forth. The server may also provide updating KMIP attributes for keys and certificates. The server 400 serves keys at the time of use to allow for centralized storage of key material in a secure location. It also includes a graphical user interface (or, in the alternative, a command line or other programmatic interface) by which administrators (or other permitted entities) centrally create, import, distribute, back up, archive and manage the lifecycle of keys and certificates. Using the interface, administrators can group devices into separate domains, defines roles and permissions, and the like. By default, typically, groups of devices only have access to encryption keys defined within their group. These role-based access control features enable separation of duties, mapping of permissions for what actions against which objects, and enforcement of data isolation and security in a multi-tenancy environment. This also enhances security of sensitive key management operations. All KMIP clients transacting business with TKLM server 700 are subject to successful trust establishment with mutual authentication before any key transactions begin with the TKLM server. Typically, network security mechanisms, such as SSL/TLS and HTTPS, are used to establish authenticated communication between the key management system and the cryptographic client.

In operation, the TKLM server 400 assists encryption-enabled devices in generating, protecting, storing, and maintaining encryption keys that are used to encrypt and decrypt information that is written to and read from devices. The key management server 400 acts as a background process waiting for key generation or key retrieval requests sent to it through a TCP/IP communication path between itself and various devices, such as some other management system, a device driver, a disk controller, a network switch, and others. These are merely representative cryptographic client devices. When a client writes encrypted data, it first requests an encryption key from the key management server. Network security mechanisms, such as SSL/TLS and HTTPS, are used to establish authenticated communication between the key management system and the cryptographic client.

The Java™ KeyStore Framework

As additional background, the Java™ Platform, Enterprise Edition (Java EE) standard supports the notion of a framework that allows usage of keys and certificates from local key repositories of different forms and types. This framework (called KeyStore API and its accompanying Service Provider Interface (SPI)) uses a database called a "keystore" to manage a repository of keys and certificates. A KeyStore class of the framework supplies well-defined interfaces to access and modify the information in a keystore.

In the Java framework, key management is carried out with respect to a database called a "keystore," which is used to manage a repository of keys and certificates. As is well-known, a certificate is a digitally-signed statement from one entity saying that the public key of some other entity has a particular value. The keystore has a defined location (typically, a user's home directory). A keystore implementation uses the notion of a Java Security class, known as the KeyStore class. The KeyStore class supplies well-defined interfaces to access and modify the information in a keystore. It is possible for there to be multiple different concrete implementations, where each implementation is for a particular type of keystore. Command-line or GUI tools may make use of KeyStore. Because KeyStore is publicly available, SDK users can write additional security applications that use it. Keystore implementations are provider-based. More specifically, the application interfaces supplied by KeyStore are implemented in terms of a Service Provider Interface (SPI). That is, there is a corresponding abstract KeystoreSpi class, also in the java.security package, which defines the SPI methods that "providers" must implement. The term "provider" in this context refers to a package or a set of packages that supply a concrete implementation of a subset of services that can be accessed by the Java™ 2 SDK Security API. Therefore, to provide a keystore implementation, clients must implement a "provider" and supply a KeystoreSpi subclass implementation. Applications can choose different types of keystore implementations from different providers, using a getInstance factory method in the KeyStore class. A keystore type defines the storage and data format of the keystore information, and the algorithms used to protect private keys in the keystore and the integrity of the keystore itself. A default keystore type is specified in a line of a security properties file. To specify that tools and other applications will use a keystore implementation other than the default keystore, that line is changed to specify a different keystore type. Or, if users are provided the ability to specify a keystore type, the type may be specified as a value and passed to a getInstance method of KeyStore.

The KeyStore class is an engine class that supplies well-defined interfaces to access and modify the information in a keystore. This class represents an in-memory collection of keys and certificates. KeyStore manages two types of entries: Key Entry, and Trusted Certificate Entry. The Key Entry is a type of keystore entry that holds very sensitive cryptographic key information, which is stored in a protected format to prevent unauthorized access. Typically, a key stored in this type of entry is a secret key, or a private key accompanied by the certificate chain authenticating the corresponding public key. Private keys and certificate chains are used by a given entity for self-authentication using digital signatures. The Trusted Certificate Entry is a type of entry that contains a single public key certificate belonging to another party. It is called a trusted certificate because the keystore owner trusts that the public key in the certificate indeed belongs to the identity identified by the subject (owner) of the certificate. This type of entry can be used to authenticate other parties. Each entry in a keystore is identified by an "alias" string. In the case of private keys and their associated certificate chains, these strings distinguish among the different ways in which the entity can authenticate itself. For example, the entity might authenticate itself using different certificate authorities, or using different public key algorithms. The main KeyStore methods in the API are: creating a KeyStore object, loading a particular KeyStore into memory, getting a list of the KeyStore aliases, determining KeyStore entry types, adding, setting or deleting KeyStore entries, getting information from the KeyStore, and saving the KeyStore.

Using Key Management Protocol Services Transparently from a KeyStore API

According to this disclosure, an application that consumes key management information (e.g., keys and certificates) through a conventional keystore API (e.g., the Java™ Security KeyStore API) is configured to recognize a new keystore type. In addition, the services of that conventional keystore API are pointed to a management server component associated with a key management protocol (e.g., KMIP), and a client component of the key management protocol (e.g., a KMIP client) is instantiated as a "semi-remote" keystore in association with the consuming application. Once configured to use the new keystore type, the consuming application uses the keystore API (a "first" API) in a conventional manner, but calls to the new keystore type are directed to the KMIP client. The KMIP client intercepts these calls and then interacts with the KMIP management server transparently to the consuming application, i.e., without the consuming application being aware of the interaction over the KMIP client-server API (a "second" API). This approach enables the consuming application to take advantage of the full benefits provided by the key management protocol without knowledge of the underlying mechanism and while using (what appears to the consuming application) just the conventional keystore API. In effect, the keystore (first) API is extended to use the KMIP (second) API transparently to facilitate various key management operations, e.g., interchange of keys between encryption applications, update of key and certificate materials, certification replacements, key modifications, and many others.

Figure 5:
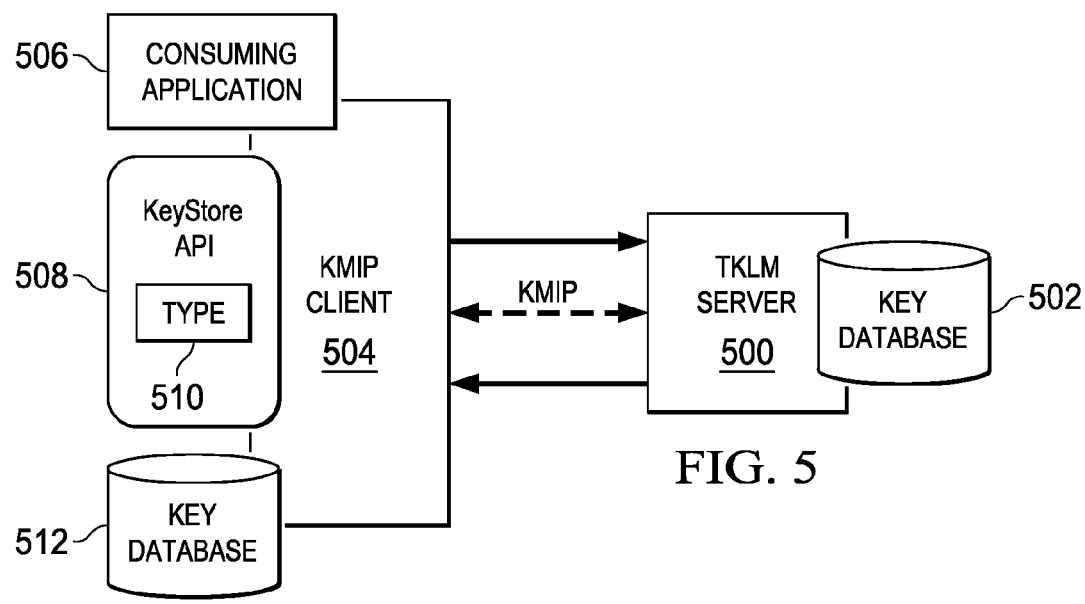
FIG. 5 illustrates how a consuming application that uses a conventional key store API is configured to use a key management protocol transparently according to the techniques of this disclosure.

FIG. 5 illustrates the basic technique of this disclosure. The elements 500, 502 and 504 correspond to the TKLM server, key database and KMIP client shown in FIG. 4. As compared to FIG. 4, this figure also illustrates a consuming application 506. The term "consuming" refers to the fact that the application "consumes" or is a "consumer" of key material (e.g., keys, certificates, and the like) from a supplier of such cryptographic materials. More generally, the consuming application is a security provider. As also shown, the consuming application 506 is presumed to be using a conventional application programming interface 508 for this purpose. A representative "first" API is the Java Security KeyStore API previously described, although this is not a limitation. The first API may be any key management API or interface that defines a particular protocol for accessing key materials.

According to this disclosure, the consuming application 506 is configured to use the KMIP protocol transparently and without awareness that it is doing so. This is highly advantageous, as the technique enables the consuming application to utilize the capabilities of the KMIP protocol (or others like it) without requiring specific code changes to the application. To achieve this, the first API is "extended" (or augmented) to include a new keystore type 510. In addition, the services of that conventional keystore API 508 are pointed to the KMIP server 500. As seen in FIG. 5, the client component 504 is instantiated as a "semi-remote" keystore (having key database 512 associated therewith). Once configured to use the new keystore type 510, the consuming application 506 uses the keystore API 508 as it would normally. Calls to the new keystore type 510, however, are directed to the KMIP client 504. The KMIP client 504 intercepts these calls and then interacts with the KMIP server 500 (over KMIP) transparently to the consuming application 506. In other words, the consuming application 506 is (or need not be) aware of the interaction over the KMIP client-server API. As noted above, this approach enables the consuming application to take advantage of the full benefits provided by the key management protocol but without knowledge of the underlying management mechanism and while using (what appears to the consuming application as) just the conventional keystore API 508. The keystore API 508 is extended to use the KMIP API transparently to facilitate various key management operations.

The types of key management operations are varied. In a typical example scenario, the consuming application includes a certificate by which it identifies itself externally. Over time, this certificate may become stale, the key length of the keys associated therewith may need to be modified, or the like. Using the keystore API in the normal manner, the consuming application initiates a call over that API to the new keystore type 510. When the call is intercepted by the KMIP client, the call ends up being serviced by the KMIP server 500 (via the KMIP API). The result that is generated by executing the server 500 is returned to the KMIP client, which then returns the result back to the consuming application. The key material may be cached in the local key database 512.

The above example is not intended to be limiting, as any type of key management operation may be implemented in this transparent manner. As another example, the consuming application may ship in an appliance with a default certificate that will need to be replaced with a true client certificate. The approach herein assumes that the appliance uses a conventional (first) API but is configured in the manner described herein. When that appliance is installed, the key management operation is initiated to exchange out the default certificate, but KMIP is used for this purpose instead of the underlying protocol that would be implemented but for the technique disclosed herein.

There is no limitation on the type of key management operation that may be implemented using the approach described herein. These operations include, without limitation, interchange of keys between encryption applications, update of key and certificate materials, certification replacements, key modifications, mutual authentication, and many others.

In one embodiment, the consuming application is IBM® WebSphere® application server, although this is not a limitation. As is well-known, this application includes a configuration tool to enable simple configuration of the new keystore type (e.g., by administrators, installers, or others). Because the keystore type is already a characteristic that needs to be specified (when configuring this type of consuming application), the approach herein (as a workflow) is easy to implement. By way of explanation (and not be limitation), the new keystore type is herein referred to as JCEKSwithKMIP, as it indicates that a local portion of the keystore is encoded as a JCEKS (encrypted keystore) type. More generally, the keystore type is NULLwithKMIP.

Because the client's identity to the KMIP server must be supplied before the remote server will disclose any key information, it is required that a client-side certificate be presented to the KMIP server as part of a TLS handshake between the KMIP client component and the KMIP server. According to another aspect of this disclosure, the keystore type encodes information to facilitate this process. In particular, preferably the keystore type includes at least a first portion, and a second portion. The first (or "local") portion is used to store at least a private key and certificate that KMIP servers will want to see on each TLS connection (as the KMIP clients are required to identify themselves via client-side certificates). As used herein, the "storing" of such information may be done in the clear or as encoded data. The second (or "global") portion is used to store the KMIP server's certificate and/or the server certificate signer's certificate (a minimal trust store).

As used herein, the keystore located in association with the consuming application is sometimes referred to as a "semi-remote" keystore. The term "semi-remote" refers to the fact that given contents of the key database 502 (normally stored at the KMIP server component) may be virtualized at the consuming application. As described, these contents typically include a private key and client certificate for a Transport Layer Security (TLS) handshake.

As an extension, the keystore type may be a ShadowJCEKSwithKMIP, to permit caching of frequently-referenced key materials locally, as well as the KMIP authentication materials. Different embodiments/configurations allow for varying degrees of caching, from very little to complete replication of potentially relevant cryptographic materials including, without limitation, keys and certificates.

Without limitation, the keystore type and the semi-remote (client-side) keystore may be configured manually, automatically or programmatically.

The techniques described herein have numerous advantages. The technique provides a standard mechanism for accessing key materials but without requiring code changes in the consuming application. That application simply utilizes its standard key management API (which may be open or proprietary), and the calls thereto are then handled "under the covers" (i.e., transparently to the consuming application), preferably using a more robust key management protocol, such as OASIS KMIP. This approach enables the consuming application to take full advantage of, or even extend, the key management operations that would otherwise be available to it, but without the additional complexity and cost of rewriting the application or the first API for this purpose. All of the operational complexity of the underlying key management protocol can be leveraged but with little or no cost.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various client-side or server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the functionality (e.g., a configuration tool, the semi-remote keystore, and so forth) can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the components described above are implemented in a special purpose computer, preferably in software executed by one or more processors. The software is maintained in one or more data stores or memories associated with the one or more processors, and the software may be implemented as one or more computer programs. Collectively, this special-purpose hardware and software comprises a system to use key management protocol services transparently from an existing key management API.

The KMIP processing may be implemented as an adjunct or extension to an existing key lifecycle manager or other policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described the invention, what is now claimed is as follows:

1. A method for managing key material, comprising:
configuring an application that uses a first application programming interface (API) to manage key material to instead use a second application programming interface, the second API associated with a key management protocol having a client component, and a server component, wherein configuring the application augments the first API to include a given keystore type and associates the client component with first API calls directed to the given keystore type;
responsive to the application making a call to the given keystore type over the first API to perform a key management operation, intercepting the call to the given keystore type and instead issuing a call from the client component to the server component over the second API, wherein the call to the server component over the second API is carried out transparently to the application; and
receiving a response to the second API call to facilitate the key management operation at the application, the response having been generated at least in part using the server component;
wherein the executing step is carried out in software executing in a hardware element.

2. The method as described in claim 1 wherein the client component and the server component communicate over Key Management Interoperability Protocol (KMIP).

3. The method as described in claim 2 wherein the first application programming interface is Java Security KeyStore API.

4. The method as described in claim 1 wherein the configuring step includes:
defining the given keystore type; and
instantiating a keystore associated with the given keystore type together with the client component such that the call over the first API is directed to the client component.

5. The method as described claim 4 wherein the keystore type includes a first portion, and a second portion.

6. The method as described in claim 5 wherein the first portion encodes a private key and a client certificate, the client certificate adapted to facilitate a secure connection between the client component and the server component.

7. The method as described in claim 5 wherein the second portion encodes a server certificate.

8. Apparatus for managing key material, comprising:
a processor;
computer memory holding computer program instructions that when executed by the processor perform to manage key material, the computer program instructions comprising:
program code to configure an application, which uses a first application programming interface (API) to manage key material, to instead use a second application programming interface, the second API associated with a key management protocol having a client component, and a server component, wherein configuring the application augments the first API to include a given keystore type and associates the client component with first API calls directed to the given keystore type;
program code that is responsive to the application making a call to the given keystore type over the first API to perform a key management operation to intercept the call to the given keystore type and instead to issue a call from the client component to the server component over the second API, wherein the call to the server component over the second API is carried out transparently to the application; and
program code to receive a response to the second API call to facilitate the key management operation at the application, the response having been generated at least in part using the server component.

9. The apparatus as described in claim 8 wherein the client component and the server component communicate over Key Management Interoperability Protocol (KMIP).

10. The apparatus as described in claim 9 wherein the first application programming interface is Java Security KeyStore API.

11. The apparatus as described in claim 8 wherein the program code to configure includes:
program code to receive data that defines the given keystore type; and
program code to instantiate and manage a keystore associated with the given keystore type together with the client component such that the call over the first API is directed to the client component.

12. The apparatus as described claim 11 wherein the keystore type includes a first portion, and a second portion.

13. The apparatus as described in claim 12 wherein the first portion encodes a private key and a client certificate, the client certificate adapted to facilitate a secure connection between the client component and the remote server component.

14. The apparatus as described in claim 12 wherein the second portion encodes a server certificate.

15. A computer program product in a non-transitory computer readable medium for use in a data processing system to manage key material, the computer program product holding computer program instructions, the computer program instructions comprising:
program code to configure an application, which uses a first application programming interface (API) to manage key material, to instead use a second application programming interface, the second API associated with a key management protocol having a client component, and a server component, wherein configuring the application augments the first API to include a given keystore type and associates the client component with first API calls directed to the given keystore type;
program code that is responsive to the application making a call to the given keystore type over the first API to perform a key management operation to intercept the call to the given keystore type and instead to issue a call from the client component to the remote server component over the second API, wherein the call to the remote server component over the second API is carried out transparently to the application; and
program code to receive a response to the second API call to facilitate the key management operation at the application, the response having been generated at least in part using the remote server component.

16. The computer program product as described in claim 15 wherein the client component and the server component communicate over Key Management Interoperability Protocol (KMIP).

17. The computer program product as described in claim 16 wherein the first application programming interface is Java Security KeyStore API.

18. The computer program product as described in claim 15 wherein the program code to configure includes:
program code to receive data that defines the given keystore type; and
program code to instantiate and manage a keystore associated with the given keystore type together with the client component such that the call over the first API is directed to the client component.

19. The computer program product as described claim 18 wherein the keystore type includes a first portion, and a second portion.

20. The computer program product as described in claim 19 wherein the first portion encodes a private key and a client certificate, the client certificate adapted to facilitate a secure connection between the client component and the server component.

21. The computer program product as described in claim 19 wherein the second portion encodes a server certificate.

22. The method as described in claim 1 wherein the client component is instantiated as a semi-remote keystore adapted to store given contents of a key database associated with the server component, and the method further includes caching in the semi-remote keystore key material provided in the response in association with the application.

23. The apparatus as described in claim 8 wherein the client component is instantiated as a semi-remote keystore adapted to store given contents of a key database associated with the server component, and the computer program instructions further include program code to cache in the semi-remote keystore key material in the response in association with the application.

24. The computer program product as described in claim 15 wherein the client component is instantiated as a semi-remote keystore adapted to store given contents of a key database associated with the server component, and the computer program instructions further include program code to cache in the semi-remote keystore key material in the response in association with the application.

* * * * *